(12) United States Patent
Schorr et al.

(10) Patent No.: US 9,207,078 B2
(45) Date of Patent: Dec. 8, 2015

(54) DEVICE FOR MEASURING AND MARKING SPACE POINTS ALONG HORIZONTALLY RUNNING CONTOUR LINES

(75) Inventors: Christian Schorr, St. Gallen (CH); Frank Schroeder, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 232 days.

(21) Appl. No.: 13/884,593

(22) PCT Filed: Nov. 8, 2011

(86) PCT No.: PCT/EP2011/069636
§ 371 (c)(1),
(2), (4) Date: Jun. 11, 2013

(87) PCT Pub. No.: WO2012/062747
PCT Pub. Date: May 18, 2012

(65) Prior Publication Data
US 2013/0326892 A1    Dec. 12, 2013

(30) Foreign Application Priority Data
Nov. 11, 2010   (EP) .................................... 10190921

(51) Int. Cl.
*G01C 5/00*    (2006.01)
*G01C 15/00*   (2006.01)
(Continued)

(52) U.S. Cl.
CPC .............. *G01C 15/06* (2013.01); *G01C 15/004* (2013.01); *G01C 15/008* (2013.01); *G01C 15/02* (2013.01); *G01C 5/00* (2013.01)

(58) Field of Classification Search
CPC ......... G01C 5/00; G01C 15/06; G01C 15/004

USPC .................................... 33/290, 228, 286, 227
See application file for complete search history.

(56) References Cited

U.S. PATENT DOCUMENTS 4,825,394 A * 4/1989 Beamish et al. .............. 356/147
6,547,397 B1   4/2003 Kaufman et al.
(Continued)

FOREIGN PATENT DOCUMENTS

CN        1719196 A       1/2006
CN      101836077 A       9/2010
(Continued)

OTHER PUBLICATIONS

European Search Report dated May 16, 2011 as received in Application No. EP 10190921.

*Primary Examiner* — Laura Martin
*Assistant Examiner* — Rhyan C Lange
(74) *Attorney, Agent, or Firm* — Maschoff Brennan

(57) ABSTRACT

A construction surveying device having a base, an upper part mounted on the base and can be rotated about an axis of rotation, a sighting unit having a laser source which is designed to emit a laser beam and a laser light detector, and an evaluation and control unit, a first rotary drive and a second rotary drive enable the upper part and the sighting unit to be driven and aligned, a spatial alignment of the sighting unit with respect to the base can be detected using two goniometers, and coordinates for space points can be determined using the evaluation and control unit, the construction surveying device has a horizontal line projection functionality which, at least sometimes, takes place automatically after triggering and is intended to measure and mark space points along a horizontal line, running in a horizontal plane, on an arbitrarily shaped surface.

27 Claims, 6 Drawing Sheets

(51) Int. Cl.
    *G01C 15/06*     (2006.01)
    *G01C 15/02*     (2006.01)
    *G01B 11/275*     (2006.01)

(56) References Cited

U.S. PATENT DOCUMENTS

| | | | |
|---|---|---|---|
| 7,350,890 B2 | 4/2008 | Baird et al. | |
| 7,460,214 B2 | 12/2008 | Schiavi | |
| 7,861,427 B2 * | 1/2011 | Schumacher et al. | 33/291 |
| 7,922,272 B2 | 4/2011 | Baird et al. | |
| 8,031,332 B2 * | 10/2011 | Miller et al. | 356/4.01 |
| 8,422,035 B2 | 4/2013 | Hinderling et al. | |
| 8,857,068 B2 * | 10/2014 | Kodaira | 33/290 |
| 2008/0152807 A1 | 6/2008 | Baird et al. | |
| 2010/0064534 A1 * | 3/2010 | Schumacher et al. | 33/228 |
| 2010/0296075 A1 * | 11/2010 | Hinderling et al. | 356/3 |
| 2011/0199431 A1 | 8/2011 | Baird et al. | |
| 2013/0074350 A1 * | 3/2013 | Le Mer et al. | 33/228 |
| 2013/0293705 A1 * | 11/2013 | Schorr et al. | 348/135 |
| 2014/0123508 A1 * | 5/2014 | Graesser et al. | 33/228 |
| 2014/0196293 A1 * | 7/2014 | Kodaira et al. | 33/227 |
| 2014/0198207 A1 | 7/2014 | Lippuner et al. | |
| 2015/0042977 A1 * | 2/2015 | Siercks et al. | 356/4.01 |

FOREIGN PATENT DOCUMENTS

| | | |
|---|---|---|
| DE | 10 2007 049 123 A1 | 4/2009 |
| DE | 10 2008 001 617 A1 | 11/2009 |
| EP | 1 001 251 A1 | 5/2000 |
| EP | 2053353 A1 | 4/2009 |
| EP | 1 733 185 B1 | 6/2009 |
| EP | 2 423 640 A1 | 2/2012 |
| JP | 2001-255149 A | 9/2001 |
| WO | 96/18083 A1 | 6/1996 |

\* cited by examiner

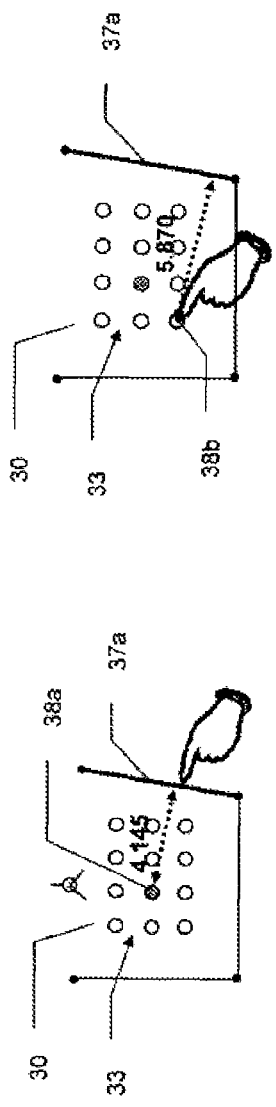
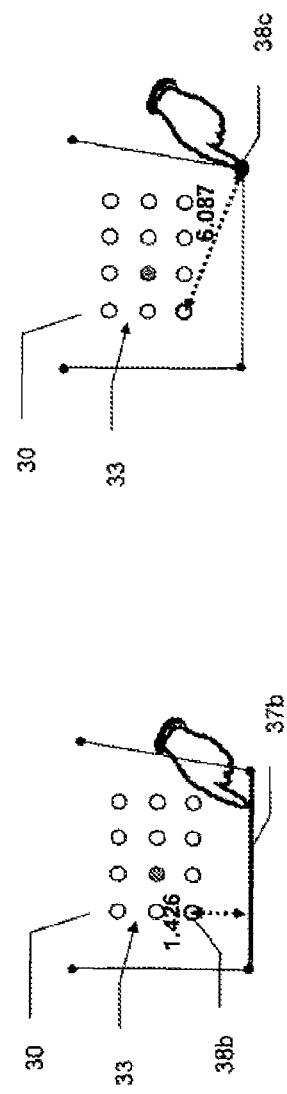

DEVICE FOR MEASURING AND MARKING SPACE POINTS ALONG HORIZONTALLY RUNNING CONTOUR LINES

FIELD OF THE INVENTION

The invention relates to a construction surveying device for measuring and marking spatial points in the context of building and/or extending buildings—in particular interior construction—and to an associated method for measuring and marking spatial points in a common horizontal plane by means of the construction surveying device, and to a computer program product for providing, controlling and executing the method.

BACKGROUND

Visible or invisible reference lines are projected in many applications, said reference lines serving as a reference for either the human eye or for electronic systems and also allowing automatic positioning or machine guidance. Here the reference lines are usually created by widening a laser beam, which is possible for straight lines in particular, or else by rotating projection of a laser point.

An example of technical devices suitable for this are rotating lasers, which serve to fix a plane using a visible or invisible laser beam and have been in use for a number of years now, for example in the building trade or in industry. They are a valuable aid for marking construction lines on horizontal, vertical or else defined angled planes. However, previous rotating lasers are disadvantageous in that they are only able to create those projection planes which contain the initial point of the laser beam. Thus, in order to project spatial points along a line in a predefined horizontal plane, the light emission point of a conventional rotating laser must be positioned precisely in this plane and the laser module must be adjusted precisely to the horizontal light emission (and the rotation axis must be aligned precisely vertical). Thus, the work region for using a rotating laser for marking a horizontal plane is restricted to the adjustment region for the height of a base on which the rotating laser is mounted. Projecting a laser beam rotating about a vertical axis by means of a conventional rotating laser in a non-horizontal (e.g. directed obliquely upward) direction leads to spatial points situated closer being projected to a lower height than spatial points situated further away.

WO 96/18083 describes a method and a device for measuring and marking on distant lines, areas or in at least partly enclosed spaces. One or more relevant spatial points are measured according to in each case two spatial angles and the distance from a reference point by means of a gimbal-mounted laser rangefinder. The laser rangefinder can be pivoted about two mutually perpendicular axes, which are equipped with goniometers. According to one embodiment described in this document, spatial points to be measured are targeted manually, and marking points are calculated from the measurement data on the basis of a predetermined relative relation between measurement and marking, which marking points are then autonomously targeted by the measuring and marking device.

An embodiment for carrying out absolute measurements and markings is also disclosed, for the purposes of which system leveling is carried out, which places the mathematical model for calculating the spatial point coordinates in relation to the actual directions in space, as a result of which it is also possible, for example, to drop perpendiculars in space.

However, no automatically running functionality is disclosed, by means of which spatial points lying in a common horizontal plane, which does not contain the emission point of the laser beam, could be targeted and marked in a simple manner; nor is an automatic sequential measurement of a plurality of spatial points extending on an iso-contour line disclosed, for comparison with for example a scan.

U.S. Pat. No. 6,547,397 discloses a laser projection system for projecting a three-dimensional image onto an object and a corresponding projection method, wherein a coordinate system is fixed by selecting at least three reference points on the object, a laser beam is projected onto each of these reference points, and the distance from each of the reference points is established by determining the propagation time of the laser beam and the horizontal and vertical angles to the object, and therefrom the three-dimensional orientation of the laser projector relative to the object is established. Although a three-dimensional object measurement or a corresponding object projection is possible on the basis of this disclosure, this document provides no indications in respect of a functionality by means of which spatial points could easily be generated in a horizontal plane which does not contain the emission point of the laser beam.

EP 1 733 185 discloses a device and a method, by means of which edges in particular are to be measured precisely on a polygonal, but otherwise planar surface. This document also does not provide indications in respect of a functionality by means of which spatial points could easily be generated in a horizontal plane which does not contain the emission point of the laser beam. Nor are there any indications in respect of measuring or projecting spatial points on arbitrary, non-polygonal surfaces.

EP 2 053 353 discloses a reference line projecting device with an electro-optical rangefinder. According to the teaching of this application, an optical reference beam, more particularly a laser beam, is guided along a defined reference path. In conjunction with running through the reference path, there is a distance measurement with respect to at least one point of the reference path by emitting a measurement beam which is parallel to or coaxial with the reference beam or by using the reference beam as measurement beam. After receiving portions of the backscattered measurement beam, a signal is derived from these portions and a distance to the at least one point is determined from the signal, wherein the guiding along the reference path is repeated at least once and a distance or distance-related variable is established in each case for the at least one point every time the reference path is run through. Thus, in the case of angle-synchronous distance measurements, the same points are scanned a number of times.

By integrating a rangefinder, the system disclosed in EP 2 053 353 also enables control of the projection on the basis of an established surface topography. In particular, what is disclosed is that, after determining a surface profile, a projection can be adapted to a curved surface in such a way that distortions as a result of the curved surface are compensated for and the projection corresponds to the undistorted contour of an object to be measured or marked.

However, nor does EP 2 053 353 disclose or suggest a functionality by means of which spatial points could easily be generated in a horizontal plane which does not contain the emission point of the laser beam.

SUMMARY

An object of the invention lies in the provision of a construction surveying device for measuring and marking spatial points, in particular wherein in each case one reference line extending in a defined horizontal plane can be generated on a surface and indexed with a high operating comfort at any heights in space—without changing the position of the device. In particular, the necessity of positioning the device level with the desired horizontal plane to be indexed should be avoided. A further object of the invention is to enable automatic running of a measurement or projection or marking of a plurality of spatial points in a common horizontal plane.

The subject matter of the invention is a construction surveying device as reference line projecting system for measuring and marking spatial points, proceeding from a first predetermined spatial point, along a line on an arbitrarily shaped surface as a projection surface in a predefined horizontal plane in a horizontal plane level of a structure—more particularly of a building. The system comprises a base and an upper part mounted on the base such that it is rotatable about a rotational axis within an angle range of an azimuth angle. Arranged on the upper part is a sighting unit, which is pivotably mounted about a pivot axis within an angle range of an elevation angle and is equipped with a laser source, configured for emitting a laser beam from a light emission point, and a laser light detector, which sighting unit provides a distance measuring functionality. In particular, the light emission point can be arranged at a standing height which is different from the horizontal plane height. The construction surveying device according to the invention furthermore comprises an evaluation and control unit.

Here, the system comprises a first and a second rotational drive, which make it possible to drive the upper part or the sighting unit or align said upper part or said sighting unit at an azimuth angle and an elevation angle. A spatial alignment of the sighting unit with respect to the base can be captured by means of two goniometers for determining the azimuth angle and the elevation angle. The evaluation and control unit is connected to the laser source, the laser light detector and the goniometers in order to associate a captured distance with a corresponding alignment (i.e. azimuth and elevation angles captured in the process) and thereby determine coordinates for spatial points.

According to the invention, the construction surveying device has a horizontal plane indication functionality, which runs at least partly automatically after being triggered. Proceeding from a known, defined first spatial point in the predefined horizontal plane, or by means of which spatial point a horizontal plane is predefined and the spatial coordinates thereof are measured and stored in a first alignment, the sighting unit is moved into an arbitrary second azimuth alignment. With the aid of the horizontal plane indication functionality, the sighting unit is automatically aligned on a second spatial point on the surface, which second spatial point is arranged in the second azimuth alignment and in the same horizontal plane as the first spatial point. To this end, the elevation angle for emitting the laser beam is automatically adapted to the horizontal plane height defined by the position of the first spatial point by the sighting unit for targeting the second spatial point.

In other words, the construction surveying device thus, according to the invention, has a horizontal line projection functionality, which runs at least partly automatically after being triggered, for measuring and marking spatial points along a horizontal line extending in a specific horizontal plane on an arbitrarily shaped surface, in the context of which, proceeding from a known first spatial point which defines the horizontal plane and after changing the azimuth alignment of the sighting unit, the elevation alignment of the sighting unit is changed, in each case under automatic control by the evaluation and control unit by means of the first and/or the second rotational drive, in such a way that precisely those spatial points which—in the corresponding respective current azimuth alignment—lie on the horizontal line are targeted and marked by the laser beam.

Here, in particular, the term horizontal plane is related to the gravitational field vector of the Earth running perpendicular thereto. The current alignment of the device with respect to the gravitational field vector of the Earth can preferably be determined with inclination sensor means—which are more particularly integrated into the base of the device—whose measurement data is likewise transmitted to the evaluation and control unit. Determining spatial coordinates of the respective plumb point can then be based thereupon. As a person skilled in the art is well aware, the inclination sensor means can in this case be configured to determine the inclination with respect to the gravitational field (or with respect to a horizontal plane aligned perpendicular to the gravitational field) in two directions (i.e. about two axes). By way of example, two single-axis inclination sensors or one two-axis inclination sensor (such as optoelectronic spirit level sensors, an optoelectronic oil pot or an optoelectronic box level) can be used for this. An example of such an oil pot-like inclination sensor, by means of which the inclination about at least two axes can be determined, is described in detail in the European patent application with the application number EP 10173726.0. Alternatively, it is also possible to determine a vertical alignment, parallel to the gravitational field vector of the Earth, by measuring the end points of a plumb rod or plumb line mounted like a free pendulum.

However, a plane can also be determined as and assumed to be a horizontal plane, even if no relationship to the alignment of the gravitational field vector is established. By way of example, it is possible to undertake a calibration measurement in advance on the basis of a room ceiling assumed to be extending in the horizontal direction and the horizontal property of further planes can be attached thereto.

In particular, the horizontal line projection functionality is equipped in such a way that, proceeding from the first spatial point, further spatial points are measured or projected between predefined spatial points in the predefined horizontal plane within an azimuth angle range, in particular at a predefined distance between spatial points to be measured or projected successively.

In the process, for the purposes of adapting the elevation alignment of the sighting unit, which occurs as a reaction to changing the azimuth alignment—more particularly instantaneously when changing the azimuth alignment— the spatial alignment of the sighting unit with respect to the base can be captured continuously by means of the two goniometers and the distance from currently targeted spatial points on the surface can be captured continuously, said capture more particularly being carried out with a frequency of at least 10 Hz.

In accordance with one development, the azimuth alignment of the sighting unit can be continuously changed in the context of the horizontal line projection functionality, under automatic control by the evaluation and control unit by means of the first and/or the second rotational drive, within a defined azimuth angle range, more particularly with an azimuth angular velocity of at least 12° per second, and, in the process, the elevation alignment of the sighting unit is in each case continuously adapted in such an automatic fashion instantaneously—i.e. parallel in time to the continuous change of the azimuth alignment—that the projection of the laser beam on the surface is always guided along the horizontal line.

As a result, the elevation alignment of the sighting unit (13) is, "instantaneously" for the rotation about the vertical axis, respectively adapted—in a real-time mode—in such a way that the projection of the laser beam (14) makes its way on the surface along the horizontal line (15).

It is furthermore preferable for the horizontal line projection functionality to be equipped in such a way that optionally, proceeding from the first spatial point, a measurement or projection of spatial points is made possible within an azimuth angle range of 360°.

That is to say that the azimuth alignment of the sighting unit is, in the process, automatically continuously changed within an azimuth angle range of 360°, more particularly with an azimuth angular velocity of at least 24° per second, specifically 36° per second. As a result, it is possible, for example, to display an iso-contour line in an interior space on all walls of a room.

In order now to display the iso-contour line successively over a specific desired time (for example during installation), it is possible for the azimuth alignment of the sighting unit to be automatically continuously changed within the specified azimuth angle range (optionally also repeatedly about 360°) in such a way that the projection of the laser beam on the surface is repeatedly, i.e. in a number of passes, guided along the horizontal line.

In the process, provision can be made for measurement data for spatial points lying on the horizontal line to be captured and stored in the context of one or more initial passes for guiding the projection of the laser beam along the horizontal line and for this initially captured and stored measurement data then to be used, so that, in subsequent passes for guiding the projection of the laser beam along the horizontal line, the instantaneous adaptation of the elevation alignment of the sighting unit when changing the azimuth alignment is optimized, more particularly such that the projection of the laser beam is guided along the horizontal line at a higher speed and/or more precisely as a result thereof.

In other words, the horizontal line projection functionality in accordance with this development is therefore equipped in such a way that, proceeding from the first spatial point, spatial points are repeatedly measured or projected between spatial points to be measured or projected successively along a line (horizontal line) situated therebetween, wherein, proceeding from stored measurement data with azimuth and elevation angles for spatial points measured or projected in advance, there is a change in the alignment of the sighting unit into an elevation angle at a higher speed and therefore a higher speed is also made possible for measuring or projecting spatial points in the predefined horizontal plane.

Additionally, in the context of the horizontal line projection functionality for optimizing the adaptation of the elevation alignment of the sighting unit, taking place instantaneously with the change of the azimuth alignment, a mathematical model can be used to describe the shape of the surface. In particular, the surface can be assumed to be a planar area, a lateral area of a cylinder or a surface of a sphere in this case. Specifically, the mathematical model can be stored in a storage medium of the evaluation and control unit and/or also created, more particularly by means of a best fit method, on the basis of stored measurement data or measurement data specifically captured for this purpose relating to distance from and angles with respect to spatial points lying on the surface.

That is to say that, for an—in particular accelerated—adaptation of the elevation angle to be set during or after changing the horizontal/azimuth alignment of the sighting device, measurement or setting angles, stored in a table, for elevation angles with respect to the respective azimuth angles can be used and can be called for the renewed elevation angle setting. In the case of surfaces with relatively simple geometric shapes as projection areas, such as, for example, surfaces which are optionally arranged at an angle with respect to one another but are otherwise planar, or surfaces with a surface contour that can easily be described mathematically, such as, for example, elliptical or circular or cylindrical surfaces (e.g. of advertising pillars), a contour profile of a projection area can also be stored in a storage medium of the evaluation and control unit as a result of pre-known data or can be determined after a first measurement or projection and stored there, as a result of which—in particular subsequent—measurements or horizontal line projections on the same projection area can likewise be accelerated in their run-time. By storing previously measured points (in a storage medium) and, if need be, subsequently calling the corresponding measurement values or by including assumptions in respect of the geometries of the surfaces, the projection (or the measurement taking place parallel in time) of the spatial points along an iso-contour line can therefore occur with increased rotational speed (and, for example, rotational speeds of approximately between 0.1 and 5 rotations per second are obtained).

In other words: the horizontal line projection functionality is preferably equipped in such a way that the elevation angle is automatically adapted for emitting the laser beam for further spatial points, to be targeted sequentially in the horizontal plane in the common with the first spatial point, with different horizontal alignments of the sighting unit. To this end, alternatively or in combination, the required elevation angle for sequential projection of the further spatial points is iteratively determined from measurement data in respect of the distance from and azimuth and elevation angles with respect to targeted spatial points or by using a mathematical function for describing the surface shape of the projection area.

For the purposes of an accelerated adaptation of an elevation angle to be set to different azimuth angles, corresponding to a different horizontal alignment of the sighting device, it is in particular also possible for mathematical functions for describing the surface shape of the projection area to be stored in a storage medium of the evaluation and control unit and to be called if required. Here, these mathematical functions for describing a surface contour can, for known surfaces, already be stored in advance in the storage medium or else be determined in a first measurement or projection step or pass from measurement data in respect of the distance from and azimuth and elevation angles with respect to spatial points targeted in a common horizontal plane and called for subsequent measurement or projection processes.

In accordance with a further aspect, the horizontal line projection functionality can also be equipped in such a way that, after predetermining a desired path length for the horizontal line on the surface, proceeding from the first spatial point, the azimuth alignment of the sighting unit is continuously changed under automatic control by the evaluation and control unit by means of the first and/or the second rotational drive until the desired path length on the surface has been traveled by the projection of the laser beam along the horizontal line.

Thus, it is then possible, proceeding from the first spatial point, to define an intended distance from spatial points to be measured or projected subsequently by means of a distance on the projection area (along the path of the horizontal line on the surface).

The evaluation and control unit as a monitoring unit for processing and displaying the data communicates with the laser light detector or a sensor, wherein monitoring unit and sensor can be physically separated and interconnected by means of wireless or wired communication connections or can be one unit. In order to align the laser beam on spatial points to be measured or to be projected, at least the laser beam itself can serve as a measurement beam. For the purposes of assisting a user with targeting a spatial point, the construction surveying device can additionally be equipped with an optical sighting aid, e.g. an overview camera or a so-called "viewfinder camera", the image of which can be displayed on a display of the monitoring unit.

Here, the sighting unit can be configured in such a way that the laser beam, which can be emitted by the laser source, serves as a measurement and marking laser beam, and the distance from the spatial point of the object surface targeted by the laser beam can be established by the evaluation and control unit on the basis of portions of the laser beam, reflected on the object surface, which are received by the laser light detector.

However, alternatively, the laser beam can also have a plurality of portions—e.g. which are also emitted by different sources—in particular a portion for use as marking laser beam and a portion for use as measurement laser beam, which is emitted parallel to or coaxially with the marking laser beam. In the process, the portions can for example have a different wavelength, for example a wavelength in the range of visible light for the marking laser beam and a wavelength in the range of IR or NIR light for the measurement laser beam. For this purpose, the sighting unit can also be configured in such a way that the laser source has two partial laser sources, which are configured separately for emitting a first portion of the laser beam as marking laser beam in the visible wavelength range and a second portion of the laser beam—extending coaxially with or with a slight parallel offset to the marking laser beam—as measurement laser beam in the near infrared wavelength range.

Further subject matter of the invention relates to a method for measuring and marking spatial points in a horizontal plane, common to these spatial points, of a construction by means of a construction surveying device according to the invention in accordance with one of the aforementioned embodiments. Following the method according to the invention, the sighting unit is initially aligned and a laser beam is emitted onto a first spatial point in a first horizontal alignment. The first spatial point is measured and the spatial coordinates thereof are stored. The sighting unit is then moved into any second horizontal alignment. After triggering the horizontal line projection functionality according to the invention, the sighting unit is automatically aligned onto a second spatial point, which is arranged in the second horizontal alignment and in the same horizontal plane as the first spatial point. In the process, the elevation angle for emitting the laser beam is automatically adapted to the horizontal plane height, defined by the position of the first spatial point, by the sighting unit for targeting the second spatial point and, as a result, the laser beam is guided on the projection area along a line in the predefined horizontal plane.

Further embodiments of the method according to the invention are, analogously, described in the dependent claims or already described above as developments of the horizontal line projection functionality according to the invention of the construction surveying device.

Further subject matter of the invention relates to a computer program product having program code, which is stored on a machine-readable medium, for providing, controlling and executing the method according to the invention or the horizontal line projection functionality of the construction surveying device according to the invention in accordance with one of the aforementioned embodiments. The program is preferably executed on an electronic data processing unit embodied as evaluation and control unit of the construction surveying device according to the invention.

Further subject matter of the invention relates to the use of the construction surveying device as an iso-contour line projecting system according to one of the above-described embodiments for measuring and marking spatial points in a predefined horizontal plane of a construction, more particularly of a building; for projection on sheets for aligning parts to be assembled, particularly in aircraft and automobile construction, for support when using tools such as, for example, for creating bores; or for general assembly support, for example for projecting onto recesses in shapes into which material parts should be fitted.

The present invention allows a user to measure or to project spatial points, extending in any predeterminable horizontal plane, or lines on a surface of a construction in a simple manner, without the construction surveying device itself necessarily having to be set up level with the desired horizontal plane and having to be aligned horizontally by hand.

The above-described construction surveying device according to the invention and method according to the invention for measuring and marking spatial points in a horizontal plane, common to these spatial points, of a construction are special embodiments for corresponding systems and methods for projecting patterns onto a defined surface or projection area with the aid of an, in particular visible, (laser) measurement beam or projection beam.

The present invention solves a special problem within the context of a more general technical problem, namely that of projecting any pattern onto a defined area as a projection area with the aid of a projection or measurement system, which, technically analogous to a construction surveying device according to the invention, is equipped with the features of the preamble of claim 1 in such a way that distortion of the pattern by obliquely extending or non-planar projection areas or walls are compensated for. In the special problem solved above according to the invention, the pattern to be created is a line extending horizontally.

For solving the more general problem, the pattern can be managed as a data record on an evaluation and control unit ("control unit", CU), for example in the form of a list of two-dimensional or three-dimensional coordinates. So that the pattern can be displayed with the correct geometry on the projection area, the measurement beam is aligned on the area and the pattern is oriented in relation to the measurement. To this end, there is at least one measurement of one or more spatial points on the projection area. Here, it is irrelevant whether the initial data for the pattern is available in two-dimensionally unoriented (affine plane) or three-dimensionally oriented (Cartesian space) form.

If a two-dimensional pattern is present, the projection area is necessarily planar; in the three-dimensional case, the projection area need not follow any predefined geometry, but the three-dimensional data of the pattern merely may not have a spatial distance (within the sought-after measurement accuracy) from the geometry of the area.

In the case of two-dimensional initial data of the pattern, the projection area is necessarily planar; in the case of three-dimensional pattern initial data, the projection area need not correspond to any predefined geometry. The three-dimensional data of the pattern should advantageously merely, within the sought-after measurement or projection accuracy, not have a spatial distance from the data of spatial points corresponding to the geometry of the projection area.

When aligning the laser beam or the measurement beam of the sighting unit, the steps to be carried out are dependent on the geometry of both the pattern and the projection area, and also on the relative geometric relation therebetween.

In the case of a two-dimensional pattern and an orthogonal planar surface or a planar surface aligned parallel to a local gravitational plumb line, a measurement of at least two (spatial) points on the planar area suffices. Should the area moreover be aligned orthogonally with respect to the measurement beam, the measurement of only a single spatial point is even sufficient.

Otherwise, at least three (spatial) points should be measured on the area, which points do not lie on a common straight line in space. If the pattern is present in three-dimensional form, it is generally necessary for these three (spatial) points to be measured to be part of the geometry of the pattern or to correspond to the latter.

If more (spatial) points are measured than the minimum number required for the respective geometric situation (redundance), the projection or measurement system can monitor or improve the accuracy of the measurement by a compensation calculation.

The steps to be carried out when orienting or aligning the pattern on the area with respect to the measurement are likewise dependent on the geometry of both the pattern and the projection area, and also on the relative geometric relation therebetween. The points in the pattern, which are coincident with the measured (spatial) points, are in this case referred to as "fixed points" in the following text.

In the case of two-dimensional patterns, it is advantageous if a (spatial) point measured previously on the area for aligning the laser beam or the measurement beam of the sighting unit is already a fixed point or corresponds to the latter, but this is not necessary. Then it is sufficient to enter into the monitoring unit which point of the pattern corresponds to the previously measured (spatial) point and therefore constitutes a fixed point in order to orient the position of the pattern. In the more general case, where a previously measured point does not correspond to a pattern point, a (spatial) point is newly measured, and the latter is brought into a geometric relation with points of the pattern by virtue of the pattern being shifted in a superposition display on a display of the monitoring unit. To this end, a coincidence of measured (spatial) points and pattern points is created ("translational correction" or "shift"), for example by specifying offset values or by graphical visualization and shift in the display of the monitoring unit by means of cursor keys. If need be, the display of the pattern should still be rotated about a (first) fixed point, which, for example, can take place by entering a rotational angle or creating a coincidence for a second point ("rotational correction"). These steps will be explained further on the basis of the figures and the associated description.

In the case of two-dimensional patterns, it is also advantageous if at least two (spatial) points, which were previously measured for aligning the laser beam or measurement beam of the sighting unit, form a line, which can be brought into relation with a line of (limiting) pattern points, by virtue of, for example, the pattern being shifted in a superposition display on a display of the monitoring unit. To this end, a coincidence of measured (spatial) points and pattern points is created ("translational correction" or "shift"), for example by specifying offset values or by graphical visualization and shift in the display of the monitoring unit by means of cursor keys. If need be, the display of the pattern should still be rotated about a (first) fixed point, which, for example, can take place by entering a rotational angle or creating a coincidence for a second point.

In the general case, three corresponding measured (spatial) points and pattern points are required in order to orient or align any pattern on any (projection) area for generating three fixed points, optionally with a combination of translational and rotational corrections as described above.

After the laser beam or measurement beam of the sighting unit has been aligned and the pattern has been oriented, any point of the pattern can automatically be projected in the correct position onto the projection area, in accordance with the user entry. This can be brought about by keyboard, joystick or speech recognition-guided entry of commands into the monitoring unit, or else by calling an automatically running sequential, point-by-point projection functionality.

BRIEF DESCRIPTION OF THE DRAWINGS

The construction surveying device according to the invention as an iso-contour line projecting system and the method according to the invention for measuring and marking spatial points in a horizontal plane, common to these spatial points, of a construction are, in a purely exemplary manner, described in more detail below on the basis of specific exemplary embodiments illustrated schematically in the drawings, wherein further advantages of the invention will also be discussed. In detail:

FIG. 3 illustrates a technical functionality and method steps for solving a more general technical problem, namely the projection of a pattern, in the specific case a grid pattern, onto a projection area in such a way that a distortion of the pattern as a result of obliquely extending or non-planar projection areas or walls is compensated for;

DETAILED DESCRIPTION

Figure 1A:
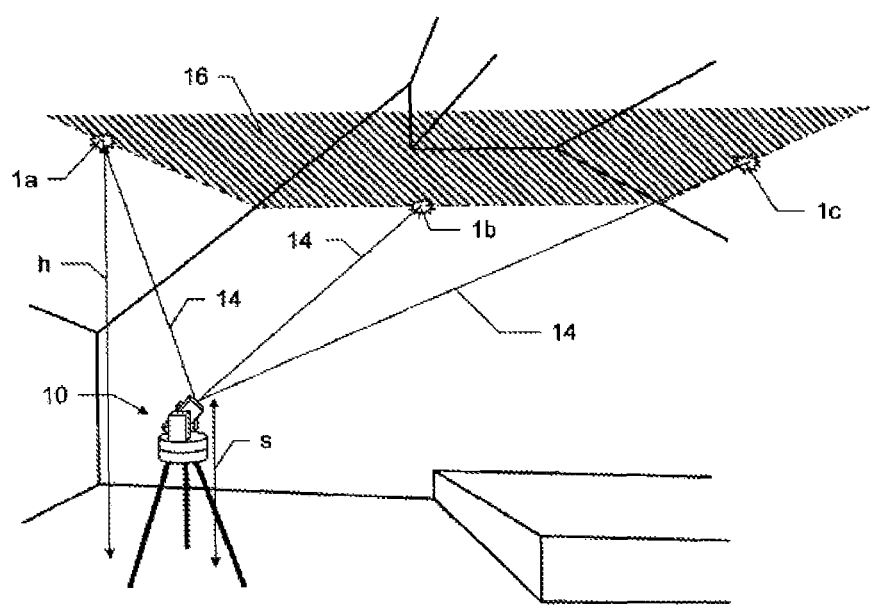
FIG. 1 illustrates a construction surveying device according to the invention and a method, which can be carried out thereby, for measuring and marking spatial points in a horizontal plane common to these spatial points.
Figure 1B:
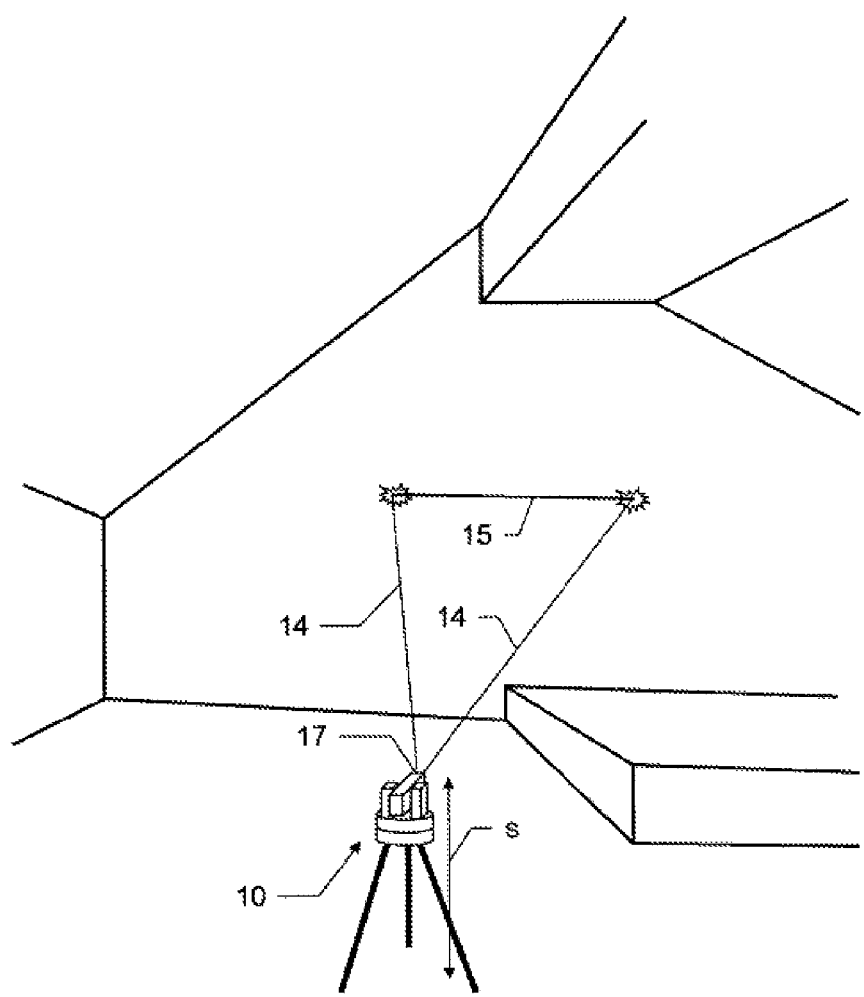

FIG. 1 illustrates a construction surveying device 10 according to the invention and a method, which can be carried out thereby, for measuring and marking spatial points 1a, 1b, 1c along a line 15 in a horizontal plane 16, common to these spatial points, of a construction, more particularly of a building.

In this example, the construction surveying device 10 comprises a base 11, embodied as a tripod, with an upper part 12 mounted thereon in a rotational fashion. A sighting unit 13, pivotably mounted on the upper part 12, is equipped with a laser source, configured for emitting a laser beam 14, emanating from a light emission point 17 at a stand height s, and a laser light detector, and thereby provides a distance measuring functionality.

Here, the sighting unit can be configured in such a way that the laser beam, which can be emitted by the laser source, serves as a measurement and marking laser beam, and the distance from the spatial point of the object surface targeted by the laser beam can be established by the evaluation and control unit on the basis of portions of the laser beam, reflected on the object surface, which are received by the laser light detector.

However, alternatively, the laser beam can also have a plurality of portions—e.g. which are also emitted by different sources—in particular a portion for use as marking laser beam and a portion for use as measurement laser beam, which is emitted parallel to or coaxially with the marking laser beam. By way of example, the portions can have a different wavelength in this case, for example a wavelength in the range of visible light for the marking laser beam and a wavelength in the range of IR or NIR light for the measurement laser beam. That is to say that the sighting unit can also be configured in such a way that the laser source has two partial laser sources, which are configured separately for emitting a first portion of the laser beam in the visible wavelength range as marking laser beam and a second portion of the laser beam—extending coaxially with or with a slight parallel offset to the marking laser beam—in the near infrared wavelength range as measurement laser beam.

The construction surveying device 10 moreover comprises an evaluation and control unit (not illustrated), wherein—likewise not illustrated—a first and a second rotational drive make it possible to drive the upper part 12 or the sighting unit 13 or align these with an azimuth and an elevation angle. The spatial alignment of the sighting unit 13 with respect to the base 11 can be captured by means of two goniometers. By way of example, the goniometers can be configured as angle sensors and inclination sensors. The evaluation and control unit is connected to the laser source, the laser light detector and the goniometers in order to associate a captured distance and captured azimuth and elevation angle with a corresponding alignment of the sighting unit 13 and thereby determine coordinates for spatial points.

In particular, provision is additionally made for a two-axis inclination sensor or two one-axis inclination sensors, by means of which it is possible to determine an inclination of the base 11 in relation to a horizontal plane, with regard to the gravitational field vector of the Earth. Firstly, this sets the external reference of the horizontal property and secondly this determines the current alignment of the base 11 (and therefore also of the sighting unit 13 and of the whole device) with respect to this external horizontal, which is related to the gravitational field vector of the Earth. In general, such additional equipment with horizontal-orientation or inclination sensors means that it is not necessary to perform a very precisely horizontally aligned setup, which is otherwise done manually and involves great difficulty, of the base 11 with respect to the gravitational field vector of the Earth, but that this can be taken into account by calculation by means of the evaluation and control unit (standing axis error compensation).

According to the invention, the construction surveying device 10 has a horizontal plane indication functionality or a horizontal line projection functionality, which runs at least partly automatically after being triggered. Proceeding from a known, defined first spatial point 1a in the predefined horizontal plane 16, or by means of the spatial arrangement of which spatial point a horizontal plane 16 is predefined and the spatial coordinates of which spatial point are measured in a first horizontal alignment and stored, the sighting unit 13 is moved into any second horizontal alignment. This can occur under direct control by a user or following automatically predetermined measurement or projection intervals. In the process, azimuth angles to be set in sequence, corresponding to different horizontal alignments of the sighting unit 13, can be related to an internal coordinate system of the construction surveying device or to predetermined spacings between adjacent spatial points 1a, 1b, 1c to be projected on the projection area 16.

With the aid of the horizontal line projection functionality, the sighting unit 13 is automatically aligned onto a second spatial point 1b, which is arranged in the second horizontal alignment and in the same horizontal plane as the first spatial point 1a. To this end, the elevation angle for emitting the laser beam 14 is automatically adapted by the sighting unit 13 to the horizontal plane height h, defined by the position of the first spatial point 1a, for targeting the second spatial point 1b, and hence guided along a line on the projection area in the predefined horizontal plane 16.

Figure 2:
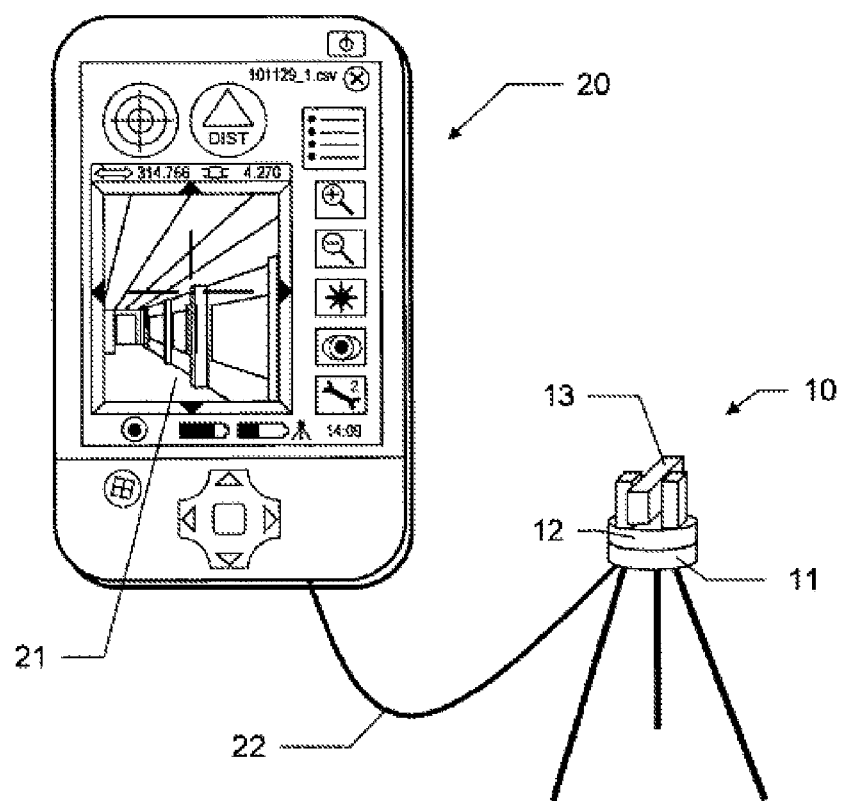
FIG. 2 illustrates a possible embodiment of a construction surveying device according to the invention.

FIG. 2 shows a possible embodiment of a construction surveying device 10 according to the invention. The system 10 comprises a monitoring unit 20 as evaluation and control unit for processing and displaying the data. The monitoring unit 20 and a laser light detector or sensor communicate with one another. The monitoring unit 20 and the laser light detector or sensor can be physically separated and interconnected by means of wireless or wired communication connections 22, or can be provided as one unit. In order to align the laser beam 14 onto spatial points to be measured or to be projected, at least the laser beam 14 itself can serve as a measurement beam. In order to assist a user with targeting a spatial point, the construction surveying device 10 can additionally be equipped with an optical sighting aid, e.g. a telescope, or an optoelectronic sighting aid, e.g. an overview camera or a so-called "viewfinder camera", the image of which can be displayed on a display 21 monitoring unit 20.

FIGS. 3a to 3e illustrate a technical functionality and method steps for solving a more general technical problem, namely that of projecting a pattern, in the specific case a grid pattern 33, onto a projection area in such a way that a distortion of the pattern as a result of obliquely extending or non-planar projection areas or walls is compensated for.

To this end, the grid pattern 33 is managed as a data record on an evaluation and control unit or a monitoring unit 20, in the form of a list of two-dimensional or three-dimensional coordinates. In order for it to be possible for the grid pattern 33 to be displayed with the correct geometry on the projection area, it is usually necessary at the outset to align the laser beam or measurement beam of the sighting unit onto the projection area.

FIGS. 3a to 3e relate to the orientation or alignment of the pattern 33 on the projection area with respect to a measurement, carried out in advance, of (spatial) points on the area, as can be carried out in accordance with the preceding description.

Figure 3A:
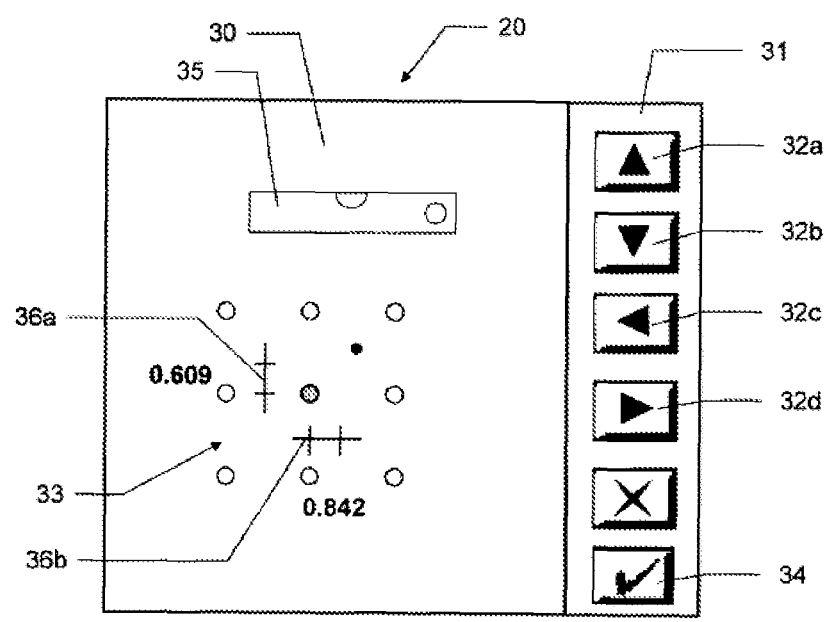

FIG. 3a illustrates a control and evaluation unit or monitoring unit 20, with a display 30 and command bar 31 with arrow keys 32a to 32d for moving the display of a grid pattern 33 on the display 30. A translational movement or shift of the grid pattern 33 on the display is generated by operating arrow keys 32a to 32d. As a result, it is possible to adapt the display of the points of the grid pattern 33 to a predetermined line, for example generated in advance, between measured (spatial) points of the projection area in parallel and/or orthogonal alignment with respect to this line. A functionality for carrying out a rotational direction or determining a horizontal alignment of the display of the grid pattern 33 can, for example, be displayed by a symbolic representation of an inclination sensor 35, e.g. as a spirit level, preferably combined with the option of entering rotations of the display of the grid pattern 33 on the display 30, which rotations are to be defined by a system user. FIG. 3a furthermore illustrates, in an exemplary fashion, a numerical display of distances 36a, 36b between selected illustrated points or lines, which preferably takes place in real time.

In the case of a two-dimensional grid pattern 33, FIG. 3b illustrates how, in a case in which a previously measured (spatial) point on a projection surface does not correspond to a grid pattern point, but a previously measured spatial point reference line 37a was determined. A user selects the reference line 37a and a grid pattern point 38a and, in accordance with the functionality of the system, a shortest distance of the grid point 38a, i.e. determined orthogonally to the reference line 37a, is displayed to the user.

In accordance with FIG. 3c, the user can, for example, select a further grid pattern point 38b, for which the shortest, i.e. likewise determined orthogonally to the reference line 37a, distance is then displayed to him.

As illustrated in FIG. 3d, the user can select a different reference line 37b, to which the shortest, i.e. determined orthogonally to the reference line 37b, distance is displayed to him, proceeding, for example, from the last selected grid pattern point 38b.

In accordance with FIG. 3e, the user can select a further grid point 38c or a measured (spatial) point as a further reference point and have displayed to him the distance to a previously selected grid pattern point.

Accepting the displayed measurement data is typically confirmed by pressing a confirmation key 34 on the command bar 31 and, after confirming the correspondence of a sufficient number of measured (spatial) points or reference points with grid pattern points, the user can move the grid pattern and adapt it to the desired dimensions and, in the case of correspondence, initialize a reality-conformable projection of the grid pattern 30.

Figure 4:
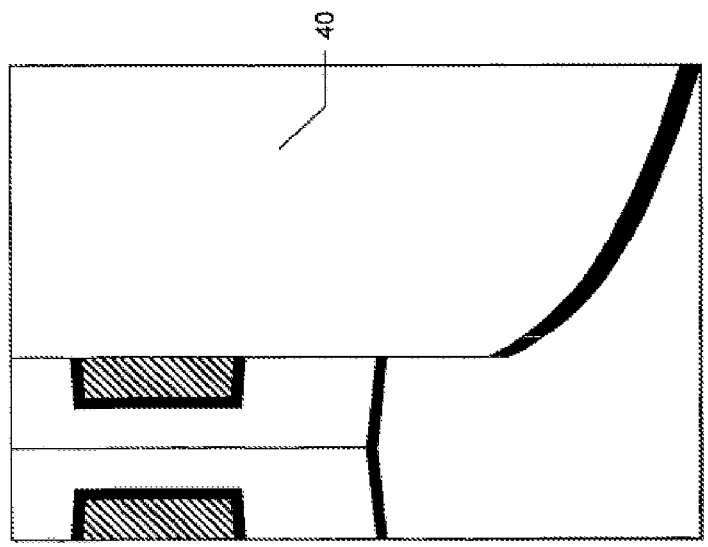
FIG. 4 illustrates, in a variation of the situation in accordance with FIGS. 3a to 3e, in which a two-dimensional point pattern is to be projected onto a round wall, more precisely onto a cylindrically shaped projection area.

In a variation of the situation in accordance with FIGS. 3a to 3e, a two-dimensional point pattern is predetermined, which should be projected onto a round wall, more precisely onto a cylinder-shaped projection area 40, as illustrated in FIG. 4.

In principle, it is possible to parameterize a geometrically regular surface—i.e. a surface which can be represented by a closed mathematical function—to transform a predetermined two-dimensional pattern onto a three-dimensional geometry and then to project it point-by-point.

A method is described in the following text, by means of which, using a reference line projecting system according to the invention, in the case of the equipment thereof with the necessary functionality for the application, the pattern can be projected in real time and without transformation.

To this end, the affine properties of the pattern, i.e. the spacings in the pattern between adjacent points, are used. A first point to be projected is targeted as a fixed point. An adjacent pattern point is selected as a next or second fixed point, wherein the laser light detector or sensor is continuously used for measurements and the sighting direction is updated iteratively until the real measured distances of the intended two fixed points correspond to the predetermined values. In order to accelerate the iteration, the first step of the iteration can be calculated under the simplifying assumption that the second fixed point lies on a fictitious plane through the first fixed point and orthogonal to the direction of the target line of the laser. This is how, in a single working step, the laser light detector or sensor is aligned and oriented with respect to a pattern reduced to initially two pattern points. In other words, in a mathematical form, this means that a fictitious plane is assumed, which is defined by these two points and the intersection with the actual real surface.

This procedure is continued from point to point, and accordingly the second and third points in conjunction with the intersection with the actual real surface define the next fictitious plane. Hence an uneven surface is continuously approximated by a sequence of planes and the pattern is projected at the same time. The accuracy and the speed of the method increase the closer the contour of the actual area to be projected follows a planar geometry.

The described procedure is afflicted with the risk of both random and systematic error propagation. Random errors can occur because the measurement inaccuracy of the system is imaged every time in the successive point-by-point iteration, whereas this measurement inaccuracy in the projection of the stored data of a (point) pattern onto a predetermined area only plays a role in the alignment of the sighting unit on the first point to be projected. Systematic errors can occur if the real area has different curvatures at different points. The iteration at one and the same (spatial) point to be projected can then, over different iteration paths, lead to differently arranged real points. If the functionality does not initially allow intermediate points in a pattern to be left out or leapfrogged and measured later, then this can also have an adverse effect.

In order to minimize the effects of both described types of error propagation, it is advantageous to set in terms of its three-dimensional coordinates a point already projected on the plane once or to store said point as a fixed point and to target the latter in accordance with its stored coordinates during a new projection procedure instead of once again targeting such a point iteratively. Alternatively or additionally for the projection of further pattern points, the predetermined distance of each of these further pattern points to a first defined fixed point can also be used for calculating the projection data, but this is connected with the risk of distortions of the projection, particularly in the case of irregularly curved surfaces.

A substantial advantage of this described procedure consists of the fact that the projection can already be started after fixing a first fixed point, and that the orientation or adaptation of the pattern to the (projection) area can, for each pattern point, take place so to speak in real time by virtue of being able to use points to be projected in sequence, as required, both for aligning the sighting unit and for orienting or adapting the pattern in respect of the (projection) area.

Figure 5:
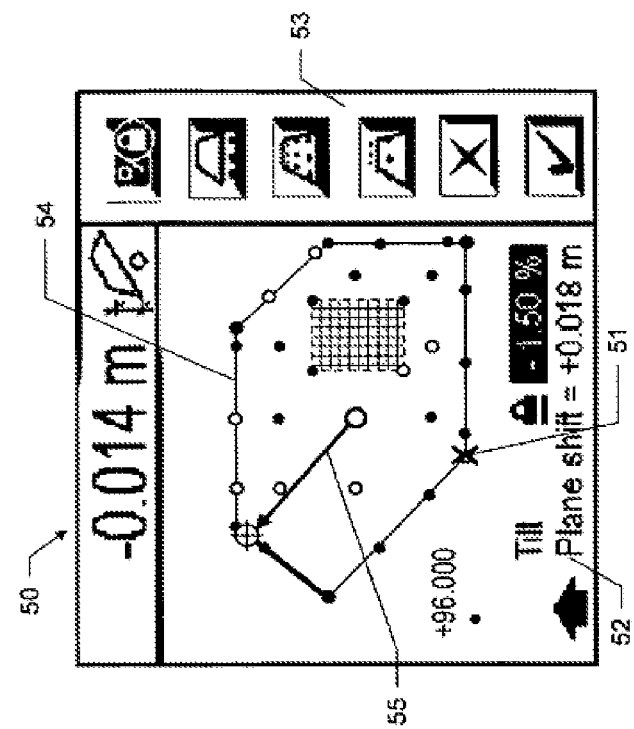
FIG. 5 illustrates a variation of the present invention with a surface contour monitoring functionality.

FIG. 5 illustrates a variation of the present invention with a surface contour monitoring functionality. A precondition for the use of the surface contour monitoring functionality is the predetermination of a contour of a reference surface. The reference surface preferably has a mathematically describable contour, for example spherically curved or planar.

The required accuracy for adapting a real surface contour to a predetermined contour of a reference surface depends on the application. In the case of applications with soil excavations or landfill, the required accuracy is typically relatively low; by contrast, for level monitoring and correction, tolerances of the order of millimeters are typical.

By way of example, in an exemplary specific application, a pit should be filled with gravel and filled up to a predetermined dumping height. Depending on the contour of the pit, it may be difficult to determine the required volume of filling material.

In accordance with another specific application, a road is planned with a road surface inclination of 2%, wherein the actual inclination of the present surface deviates from the planned profile as a result of unevenness. The responsible persons on site must consequently adapt the implementation of the planned construction project to the real situation.

The known prior art does not allow a user to vary the geometry of the reference surface using simple means and to test corresponding potential effects on the real situation. Instead, the user must typically carry out correspondingly successive measurements and/or calculations for determining or adapting a reference surface to the real topography.

In order to apply the surface contour monitoring functionality, illustrated on the basis of FIG. 5, a delimiting line 54 and some real (spatial) points for determining the real geometry of the surface to be processed must, as one precondition, have been measured in advance. After calling the program, a graphical representation of the surface contour monitoring functionality is shown on a display 50 of a monitoring unit. The predetermined reference surface and the measured points of the real surface are superposed on the display 50. The user can select any measured spatial point 51, from which the distance 52 to the reference surface is shown to him. By means of corresponding input commands 53, for example by graphical activation of control fields, the geometry of the reference surface can be modified; for example, a planar reference surface can be raised or lowered or changed in terms of its inclination. By way of example, an arrow 55 can be used to show the direction (gradient) of an inclination of the reference surface. By way of example, the user can, after selecting ("clicking") the arrow 55 for displaying the inclination direction, move the latter and align it in any other direction in order thus to change the contour of the reference surface.

Differences between the measured geometry of the real surface, for example in respect of distance, inclination, material volumes required for adjustment to the reference surface, etc., are displayed in real time on the changed geometry of the reference surface.

This functionality allows a single user to undertake an adaptation between a real surface and a reference surface. The required complexity for adapting the planned geometry of a construction in terms of its implementation with respect to a real surface geometry is thereby significantly reduced.

It is understood that these illustrated figures only schematically illustrate possible exemplary embodiments. The various approaches can likewise be combined with one another and with methods from the prior art.

What is claimed is:

1. A construction surveying device for measuring and marking spatial points in the context of building buildings or extending buildings including interior construction, the device comprising:
   a base;
   an upper part mounted on the base such that it is rotatable about a rotational axis;
   a sighting unit, which is pivotably mounted about a pivot axis on the upper part, provides a distance measuring functionality and has a laser source, configured for emitting a laser beam, and a laser light detector; and
   an evaluation and control unit, wherein:
      a first and a second rotational drive make it possible to drive and align the upper part or the sighting unit;
      a spatial alignment of the sighting unit with respect to the base can be captured by means of two goniometers;
      the evaluation and control unit is connected to the laser source, the laser light detector and the goniometers in order to associate a captured distance with a corresponding alignment and thereby determine coordinates for spatial points; and
      the construction surveying device has a horizontal line projection functionality, which runs at least partly automatically after being triggered, for measuring and marking spatial points along a horizontal line extending in a horizontal plane on an arbitrarily shaped surface, in the context of which, proceeding from a known first spatial point which defines the horizontal plane and after changing the azimuth alignment of the sighting unit, the elevation alignment of the sighting unit is changed, in each case under automatic control by the evaluation and control unit by means of either or both of the first rotational drive and the second rotational drive, in such a way that precisely those spatial points which, in the corresponding respective current azimuth alignment, lie on the horizontal line are targeted and marked by the laser beam.

2. The construction surveying device as claimed in claim 1, wherein:
   for the purposes of adapting the elevation alignment of the sighting unit, which occurs as a reaction to changing the azimuth alignment;
   the spatial alignment of the sighting unit with respect to the base is captured continuously by means of the two goniometers; and
   the distance from currently targeted spatial points on the surface is captured continuously.

3. The construction surveying device as claimed in claim 2, wherein said capture is carried out with a frequency of at least 10 Hz.

4. The construction surveying device as claimed in claim 1, wherein for the purposes of adapting the elevation alignment of the sighting unit, which occurs as a reaction to changing the azimuth alignment including instantaneously when changing the azimuth alignment.

5. The construction surveying device as claimed in claim 1, wherein the azimuth alignment of the sighting unit is continuously changed in the context of the horizontal line projection functionality, under automatic control by the evaluation and control unit by means of either or both of the first rotational drive and the second rotational drive, within a defined azimuth angle range.

6. The construction surveying device as claimed in claim 1, wherein the azimuth alignment of the sighting unit is continuously changed in the context of the horizontal line projection functionality, under automatic control by the evaluation and control unit by means of either or both of the first rotational drive and the second rotational drive, with an azimuth angular velocity of at least 12° per second, and, in the process, the elevation alignment of the sighting unit is in each case continuously adapted in such an automatic fashion instantaneously parallel in time to the continuous change of the azimuth alignment that the projection of the laser beam on the surface is always guided along the horizontal line.

7. The construction surveying device as claimed in claim 2, wherein:
   the azimuth alignment of the sighting unit is automatically continuously changed within an azimuth angle range of 360°; or
   the horizontal line projection functionality is equipped in such a way that, after predetermining a desired path length for the horizontal line on the surface, proceeding from the first spatial point, the azimuth alignment of the sighting unit is continuously changed under automatic control by the evaluation and control unit by means of either or both of the first rotational drive and the second rotational drive until the desired path length on the surface has been traveled by the projection of the laser beam along the horizontal line.

8. The construction surveying device as claimed in claim 7, wherein the azimuth alignment of the sighting unit is automatically continuously changed within an azimuth angle range of 360° and with an azimuth angular velocity of at least 24° per second.

9. The construction surveying device as claimed in claim 8, wherein the azimuth alignment of the sighting unit is automatically continuously changed within an azimuth angle range of 360° and with an azimuth angular velocity of 36° per second.

10. The construction surveying device as claimed in claim 8, wherein the azimuth alignment of the sighting unit is automatically continuously changed within the specified azimuth angle range in such a way that the projection of the laser beam on the surface is repeatedly, i.e. in a number of passes, guided along the horizontal line and, proceeding from measurement data, which is stored in the context of one or more initial passes for guiding the projection of the laser beam along the horizontal line, for spatial points lying on the horizontal line is used, so that, in subsequent passes, the instantaneous adaptation of the elevation alignment of the sighting unit when changing the azimuth alignment is optimized, and hence the guiding along the horizontal line is also optimized, more particularly such that the projection of the laser beam is guided along the horizontal line at either or both of a higher speed and more precisely as a result thereof.

11. The construction surveying device as claimed in claim 7, wherein in the context of the horizontal line projection functionality for optimizing the corresponding adaptation of the elevation alignment of the sighting unit, taking place instantaneously with the change of the azimuth alignment, a mathematical model is used to describe the shape of the surface, in particular wherein the surface is assumed to be a planar area, a lateral area of a cylinder or a surface of a sphere.

12. The construction surveying device as claimed in claim 11, wherein the surface is assumed to be a planar area, a lateral area of a cylinder or a surface of a sphere.

13. The construction surveying device as claimed in claim 11, wherein the mathematical model is either or both stored in a storage medium of the evaluation and control unit and created, more particularly by means of a best fit method, on the basis of stored measurement data or from measurement data specifically captured for this purpose relating to distance from and angles with respect to spatial points lying on the surface.

14. The construction surveying device as claimed in claim 1, wherein:
the sighting unit is configured in such a way:
that the laser beam, which can be emitted by the laser source, serves as a measurement and marking laser beam; or
that the laser source has two partial laser sources, which are configured separately for emitting a first portion of the laser beam as marking laser beam in the visible wavelength range and a second portion of the laser beam, extending coaxially with or with a slight parallel offset to the marking laser beam, as measurement laser beam in the near infrared wavelength range;
and the distance from the spatial point of the object surface targeted by the laser beam can be established by the evaluation and control unit on the basis of portions of the laser beam, reflected on the object surface, which are received by the laser light detector.

15. The construction surveying device as claimed in claim 1, wherein an external reference to the horizontal property can be created by either or both:
inclination sensor means, which are configured to determine the inclination with respect to the gravitational field vector of the Earth about two axes and to transmit the measurement data thereof to the evaluation and control unit, more particularly wherein the inclination sensor means are integrated into the base; and
calibration measurement in advance of a reference situated in a known external alignment, more particularly of two end points of a plumb rod or plumb line, mounted like a pendulum, or of a reference plane, which is assumed to be aligned horizontally, and derivation of the external horizontal property resulting therefrom by means of the evaluation and control unit.

16. The construction surveying device as claimed in claim 1, the inclination sensor means are integrated into the base.

17. A method for measuring and marking spatial points in a common horizontal plane of a construction by means of a construction surveying device as set forth in claim 1, comprising the following steps:
aligning the sighting unit and emitting the laser beam onto a first spatial point;
measuring the first spatial point and storing the spatial coordinates thereof;
changing the azimuth alignment of the sighting unit; and
adapting the elevation alignment of the sighting unit, which takes place after changing the azimuth alignment, in each case under automatic control by the evaluation and control unit by means of either or both of the first rotational drive and the second rotational drive, in such a way that precisely those spatial points which, in the corresponding respective current azimuth alignment, lie on the horizontal line are targeted and marked by the laser beam.

18. The method as claimed in claim 17, wherein:
for the purposes of adapting the elevation alignment of the sighting unit, which occurs as a reaction to changing the azimuth alignment:
the spatial alignment of the sighting unit with respect to the base is captured continuously by means of the two goniometers and
the distance from currently targeted spatial points on the surface is captured continuously.

19. The method as claimed in claim 17, wherein:
for the purposes of adapting the elevation alignment of the sighting unit, which occurs as a reaction to changing the azimuth alignment instantaneously when changing the azimuth alignment:
the spatial alignment of the sighting unit with respect to the base is captured continuously by means of the two goniometers and
the distance from currently targeted spatial points on the surface is captured continuously,
said capture being carried out with a frequency of at least 10 Hz.

20. The method as claimed in claim 17, wherein the azimuth alignment of the sighting unit is continuously changed under automatic control by the evaluation and control unit by means of either or both of the first rotational drive and the second rotational drive, within a defined azimuth angle range, more particularly with an azimuth angular velocity of at least 12° per second, and, in the process, the elevation alignment of the sighting unit is in each case continuously adapted in such an automatic fashion instantaneously, i.e. parallel in time to the continuous change of the azimuth alignment, that the projection of the laser beam on the surface is always guided along the horizontal line.

21. The method as claimed in claim 17, wherein the azimuth alignment of the sighting unit is automatically continuously changed within an azimuth angle range of 360°; or after predetermining a desired path length for the horizontal line on the surface, proceeding from the first spatial point, the azimuth alignment of the sighting unit is continuously changed under automatic control by the evaluation and control unit by means of either or both of the first rotational drive and the second rotational drive until the desired path length on the surface has been traveled by the projection of the laser beam along the horizontal line.

22. The method as claimed in claim 21, wherein the azimuth alignment of the sighting unit is automatically continuously changed within an azimuth angle range of 360° with an azimuth angular velocity of at least 24° per second.

23. The method as claimed in claim 21, wherein the azimuth alignment of the sighting unit is automatically continuously changed within an azimuth angle range of 360° with an azimuth angular velocity 36° per second.

24. The method as claimed in claim 17, wherein the azimuth alignment of the sighting unit is automatically continuously changed within the specified azimuth angle range in such a way that the projection of the laser beam on the surface is repeatedly, in a number of passes, guided along the horizontal line and, proceeding from measurement data, which is stored in the context of one or more initial passes for guiding the projection of the laser beam along the horizontal line, for spatial points lying on the horizontal line is used, so that, in subsequent passes, the instantaneous adaptation of the elevation alignment of the sighting unit when changing the azimuth alignment is optimized, and hence the guiding along the horizontal line is also optimized, more particularly such that the projection of the laser beam is guided along the horizontal line at either or both of a higher speed and more precisely as a result thereof.

25. The method as claimed in any one of claims 17, wherein for optimizing the corresponding adaptation of the elevation alignment of the sighting unit, taking place instantaneously with the change of the azimuth alignment, a mathematical model is used to describe the shape of the surface, in particular wherein the surface is assumed to be a planar area, a lateral area of a cylinder or a surface of a sphere, in particular wherein the mathematical model is either or both stored in a storage medium of the evaluation and control unit and, more particularly by means of a best fit method, on the basis of stored measurement data or from measurement data specifically captured for this purpose relating to distance from and angles with respect to spatial points lying on the surface.

26. A tangible non-transitory computer program product having program code, which is stored on a machine-readable medium, for providing, controlling and executing the method as claimed in claim 17.

27. A tangible non-transitory computer program product having program code, which is stored on a machine-readable medium, for providing, controlling and executing the method as claimed in claim 17 and carried out using a construction surveying device for measuring and marking spatial points in the context of building buildings or extending buildings including interior construction the construction surveying device comprising:
   a base;
   an upper part mounted on the base such that it is rotatable about a rotational axis;
   a sighting unit, which is pivotably mounted about a pivot axis on the upper part, provides a distance measuring functionality and has a laser source, configured for emitting a laser beam, and a laser light detector; and
   an evaluation and control unit, wherein:
      a first and a second rotational drive make it possible to drive and align the upper part or the sighting unit;
      a spatial alignment of the sighting unit with respect to the base can be captured by means of two goniometers;
      the evaluation and control unit is connected to the laser source, the laser light detector and the goniometers in order to associate a captured distance with a corresponding alignment and thereby determine coordinates for spatial points; and
      the construction surveying device has a horizontal line projection functionality, which runs at least partly automatically after being triggered, for measuring and marking spatial points along a horizontal line extending in a horizontal plane on an arbitrarily shaped surface, in the context of which, proceeding from a known first spatial point which defines the horizontal plane and after changing the azimuth alignment of the sighting unit, the elevation alignment of the sighting unit is changed, in each case under automatic control by the evaluation and control unit by means of either or both of the first rotational drive and the second rotational drive, in such a way that precisely those spatial points which, in the corresponding respective current azimuth alignment, lie on the horizontal line are targeted and marked by the laser beam.

* * * * *